United States Patent [19]

Kubo

[11] 4,383,277
[45] May 10, 1983

[54] COPYING APPARATUS COMPRISING INTERCONNECTABLE COPYING MACHINES

[75] Inventor: Kikuo Kubo, Tokyo, Japan

[73] Assignee: Ricoh Company, Ltd., Tokyo, Japan

[21] Appl. No.: 937,960

[22] Filed: Aug. 30, 1978

[30] Foreign Application Priority Data

Sep. 6, 1977 [JP] Japan ................................ 52-107127

[51] Int. Cl.$^3$ .............................................. H04N 1/22
[52] U.S. Cl. .................... 358/258; 358/256; 358/280; 358/286; 358/296
[58] Field of Search ................ 358/296–304, 358/286, 256–258, 75, 280

[56] References Cited

U.S. PATENT DOCUMENTS

| 2,652,448 | 9/1953 | Hunt | 358/256 |
|---|---|---|---|
| 2,902,538 | 9/1959 | Edgar | 358/256 |
| 3,004,100 | 10/1961 | Taudt | 358/283 |
| 3,064,077 | 11/1962 | Cary | 358/286 |
| 3,280,252 | 10/1966 | Lilien et al. | 358/256 |
| 3,621,126 | 11/1971 | Taudt et al. | 358/75 |
| 3,671,666 | 6/1972 | Hennig | 358/75 |
| 3,824,334 | 7/1974 | Jacobson et al. | 358/257 |

OTHER PUBLICATIONS

Thorpe, Tripple Function Box, IBM Tech. Disc. Bulletin, vol. 15, No. 10, 3/73, pp. 3259–3260.

*Primary Examiner*—Raymond F. Cardillo, Jr.
*Attorney, Agent, or Firm*—David G. Alexander

[57] ABSTRACT

A plurality of copying machines (12), (13), (14) are connected to a control unit (16) which may control the copying machines (12), (13), (14) to operate individually in a conventional manner. Alternatively, two or more copying machines (12), (13), (14) may reproduce an original document scanned by one of the copying machines (12), (13), (14). Also, one or more copying machines (12), (13), (14) may reproduce two or more original documents scanned by respective copying machines (12), (13), (14) in a superimposed manner. As yet another alternative two more copying machines (12), (13), (14) may each reproduce two or more original documents which are sequentially scanned by respective copying machines (12), (13), (14), thereby collating the copies.

7 Claims, 3 Drawing Figures

COPYING APPARATUS COMPRISING INTERCONNECTABLE COPYING MACHINES

BACKGROUND OF THE INVENTION

The present invention relates to a multi-function copying apparatus comprising a plurality of copying machines connected to a control unit.

A conventional copying apparatus comprises a single copying machine which operates on the electrostatic or Xerographic principle and produces one copy of one original document per machine operation. Such a copying machine is inherently slow in operation where it is desired to make more than one copy of a single original document.

It is often desired to make a copy consisting of images of two or more original documents superimposed on each other. A conventional copying machine is capable of making such a copy. A copy is made of a first original document. Then, the copy is inserted into a copy paper holder or cassette and fed through the machine again to copy the second original document on top of the image of the first original document. However, such a process is very time consuming and inconvenient.

As an alternative arrangement for making superimposed copies, a first original document is optoelectronically scanned and an electronic image thereof stored in a memory. Then, the second document is scanned and the electronic image thereof combined with the first image while printing a copy. This prior art arrangement is disadvantageous in that a very large and expensive electronic memory is required and only two documents may be superimposed.

Also, it is often desired to make several copies of multi-page documents and collate the resulting copies. This operation may be performed using a conventional copying machine in two ways. The first way involves copying each of the pages in sequence to provide a first multi-page copy, copying each of the pages in sequence again to provide a second multi-page copy, etc. Although this method produces collated copies, it is very time consuming since each page must be manually placed on a platen or the like a number of times equal to the number of copies desired.

The second way to produce collated copies is to copy each page a number of times corresponding to the number of copies desired, then copy the next page the same number of times, etc., and then manually collate the pages.

Although both of these methods produce collated copies, they are both slow, and such conventional copying machines constitute bottlenecks in large business operations. Although auxiliary collation units are available for conventional copying machines, they are complicated, expensive and prone to frequent malfunction.

SUMMARY OF THE INVENTION

A copying apparatus according to the present invention includes a plurality of copying machines each having scanning means for scanning an original document and producing electrical signals corresponding thereto and printing means for reproducing an original document in response to electrical signals corresponding thereto. Switch means selectively connect at least one of the scanning means to at least one of the printing means.

It is an object of the present invention to provide a copying apparatus comprising a plurality of copying machines, each of which is capable of performing the functions of a conventional copying machine.

It is another object of the present invention to provide a copying apparatus comprising a plurality of copying machines which are capable of simultaneously reproducing an original document scanned by one of the copying machines.

It is another object of the present invention to provide a copying apparatus comprising a plurality of copying machines, each of which is capable of producing a superimposed copy of two or more original documents scanned by respective copying machines.

It is another object of the present invention to provide a copying apparatus comprising a plurality of copying machines, each of which is capable of producing collated copies of original documents sequentially scanned by respective copying machines.

It is another object of the present invention to provide a generally improved copying apparatus.

Other objects, together with the foregoing, are attained in the embodiment described in the following description and illustrated in the accompanying drawing.

DESCRIPTION OF THE PREFERRED EMBODIMENT

While the copying apparatus of the invention is susceptible of numerous physical embodiments, depending upon the environment and requirements of use, substantial numbers of the herein shown and described embodiment have been made, tested and used, and all have performed in an eminently satisfactory manner.

Figure 1:
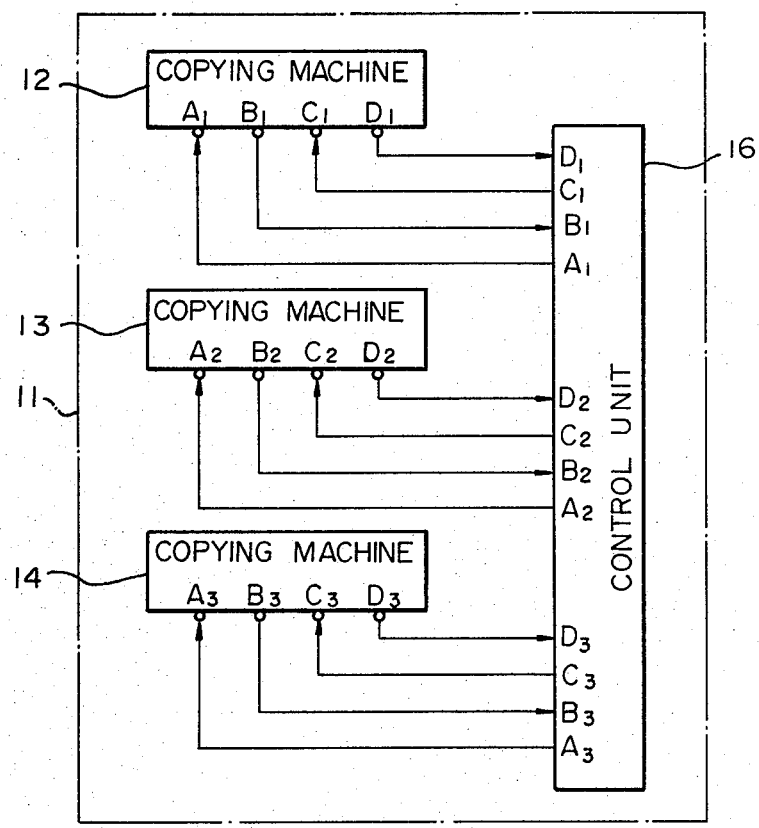
FIG. 1 is a block diagram of a copying apparatus embodying the present invention.
Figure 2:
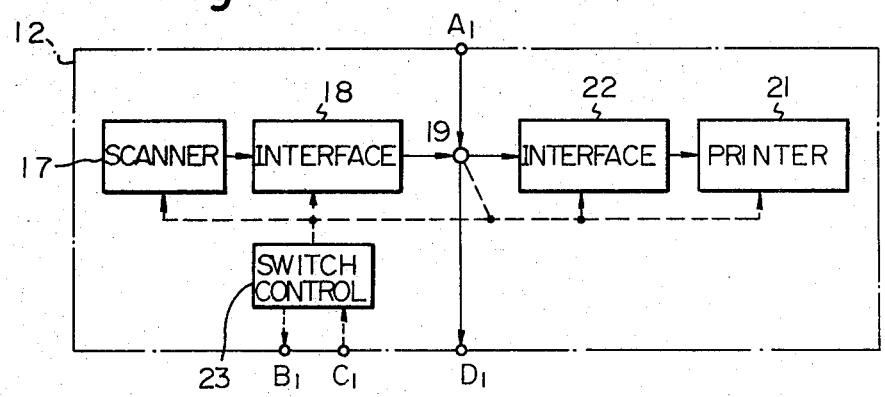
FIG. 2 is a block diagram of an individual copying machine of the present apparatus.

Referring now to FIG. 1 of the drawing, a copying apparatus embodying the present invention is generally designated by the reference numeral 11 and comprises copying machines 12, 13 and 14 which are connected to a control unit 16. The copying machines 12, 13 and 14 are typically identical, with the internal construction of the copying machine 12 shown in FIG. 2.

The copying machine 12 comprises an optoelectronic scanner 17 for scanning an original document and producing electrical signals corresponding thereto. Although the internal construction of the scanner 17 is not shown in detail, it typically comprises a row of optoelectronic sensors, means for sequentially strobing the sensors for horizontal scan and means for moving the document perpendicular to the row of sensors for vertical scan. The output signals of the scanner 17 are passed through an interface 18 to a switch 19.

The copying machine 12 further comprises a printer 21 which is connected to the switch 19 through an interface 22. Further illustrated is a switch control unit 23 which controls the switch 19.

Figure 3:
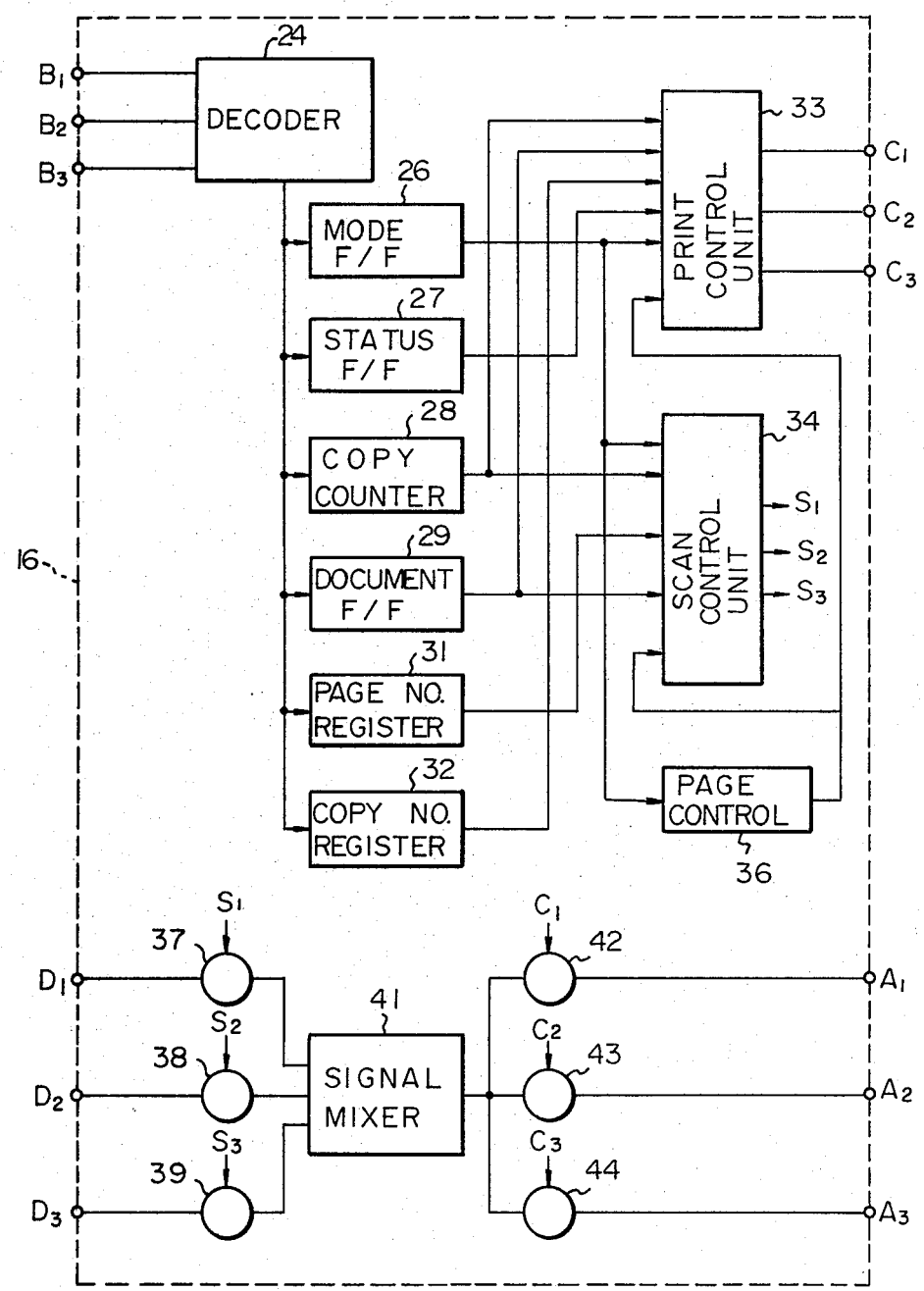
FIG. 3 is a block diagram of a control unit of the present apparatus.

As shown in FIG. 3 the control unit 16 comprises a decoder 24 which decodes instruction signals B1, B2 and B3 from the switch control units 23 of the copying machines 12, 13 and 14 respectively. Outputs of the decoder 24 are connected to a mode flip-flop unit 26, a machine status flip-flop unit 27, a copy counter unit 28, a document flip-flop unit 29, a page number register unit 31 and a copy number register unit 32. Outputs of the units 26, 27, 28, 29 and 32 are connected to inputs of a print control unit 33. The unit 33 produces control signals C1, C2 and C3 which are fed to the switch control units 23 of the copying machines 12, 13 and 14 respectively.

Outputs of the units 26, 28, 29 and 31 are connected to inputs of a scan control unit 34. An output of the unit 26 is also connected to an input of a page control unit 36, an output of which is connected to inputs of the units 33 and 34.

Data signals D1, D2 and D3 from the interfaces 18 of the copying machines 12, 13 and 14 are connected to inputs of analog input switches or gates 37, 38 and 39 respectively. Switch signals S1, S2 and S3 are fed from the scan control unit 34 to control inputs of the gates 37, 38 and 39 respectively. Outputs of the gates 37, 38 and 39 are connected to inputs of a signal mixer 41.

The output of the signal mixer 41 is connected to inputs of analog output switches or gates 42, 43 and 44. The control signals C1, C2 and C3 are fed to control inputs of the gates 42, 43 and 44 respectively. The outputs of the gates 42, 43 and 44 are fed as data signals A1, A2 and A3 to the switches 19 of the copying machines 12, 13 and 14 respectively.

Although not shown in detail, the switch control unit 23 of each copying machine is provided with a number of switches, keys or the like for setting instructions into the respective copying machine. The switch control units 23 generate the signals B1, B2 and B3 in response to the depressed keys which are decoded by the decoder 24.

As will be described in detail below, the apparatus 11 is capable of functioning in an individual copying mode, an interlocked copying mode, a superimposed copying mode and a collation copying mode. The desired copying mode is selected by depressing appropriate keys at any of the copying machines 12, 13 or 14. A corresponding signal B1, B2 or B3 is decoded by the decoder 24 and applied to the mode flip-flop unit 26. The unit 26 comprises four flip-flops corresponding to the respective copying modes. One or more of the flip-flops are set depending on which copying mode is selected.

The status flip-flop unit 27 comprises three flip-flops which indicate the status of the respective copying machines 12, 13 and 14. The flip-flops are normally reset and are set when the respective copying machines are unavailable for use due to being broken, etc.

The copy counter unit 28 comprises three counters for counting the numbers of copies produced by the copying machines 12, 13 and 14 respectively.

The document flip-flop unit 29 comprises three flip-flops which are normally reset but which are set when an original document is placed in the respective copying machines 12, 13 and 14 for reproduction.

The page number register unit 31 comprises a storage register or counter for storing a maximum or highest page number of a multi-page document in the collation mode.

The copy number register 32 comprises a counter which is initially set to the desired number of copies to be made of an original document and decremented each time a copy is made.

The operation of the apparatus 11 will now be described in detail in each of the four copying modes enumerated above.

Individual Copying Mode

In the individual copying mode it is desired to use each of the copying machines 12, 13 and 14 as an individual copying machine which is not interconnected in any way with the other copying machines. In response to depression of an individual copying mode key on any of the copying machines 12, 13 and 14, the decoder 24 decodes the resulting signal B1, B2 or B3 and sets the individual copying mode flip-flop in the unit 26. This causes the print control unit 33 to feed signals C1, C2 and C3 to the switch control units 23 of all of the copying machines 12, 13 and 14 causing the switches 19 to connect the outputs of the interfaces 18 to the inputs of the interfaces 22 thereof. This causes the output signals of the scanners 17 to be connected to the inputs of the printers 21. In addition, the signals C1, C2 and C3 inhibit the gates 42, 43 and 44 thereby disconnecting the output of the mixer 41 from the switches 19 of the copying machines 12, 13 and 14. Also, the scan control unit 34 produces signals S1, S2 and S3 which inhibit the gates 37, 38 and 39 and disconnect the switches 19 of the copying machines 12, 13 and 14 from the mixer 41.

Interlocked Copying Mode

In this mode it is desired to scan an original document placed in one of the copying machines and simultaneously reproduce the document with at least two of the copying machines. Where all of the copying machines 12, 13 and 14 simultaneously reproduce the document, the copying speed is three times that obtainable with a conventional copying machine.

In this mode an interlocked copying mode key is depressed at one of the copying machines 12, 13 and 14 and the document to be copied is placed in the scanner 17 thereof. The decoder 24 decodes the corresponding signals B1, B2 or B3 and sets the interlocked mode flip-flop of the unit 26. In addition, the flip-flop of the unit 29 is set which corresponds to the copying machine in which the document is placed. The number of copies to be made is set in the copy number register 32.

Assuming, for example, that the document is placed in the copying machine 13 and that five copies are to be made, the scan control unit 34 will generate a signal S2 to enable the gate 38. This connects the output of the interface 18 of the copying machine 13 to the mixer 41. The print control unit 33 produces signals C1, C2 and C3 which enable the gates 42, 43 and 44 to connect the output of the mixer 41 to the interfaces 22 of all of the copying machines 12, 13 and 14. The signals C1, C2 and C3 also control the switches 19 to disconnect the interfaces 18 from the interfaces 22 in all of the copying machines 12, 13 and 14.

The document is scanned by the scanner 17 of the copying machine 13 and the resulting data signals D2 passed through the interface 18 and switch 19 of the copying machine 13 and the gate 38 to the mixer 41. From the mixer 41 the signals, here designated as A1, A2 and A3, are passed through the gates 42, 43 and 44 to the interfaces 22 of all of the copying machines 12, 13 and 14. In response to the signals A1, A2 and A3, the printers 21 of the copying machines 12, 13 and 14 all reproduce the original document. Thus, although the document is only scanned once by the copying machine 13, three copies are produced by the copying machines 12, 13 and 14 respectively.

Since it is desired to produce 5 copies, the document is scanned again by the copying machine 13. However, since the copy number register 32 has been decremented to the count of 2, the print control unit 33 produces only the signals C1 and C2 to enable the gates 42 and 43. The gate 44 is inhibited, and therefore the signals A3 are not passed to the copying machine 14. Thus, during the second scanning operation of the document, only two copies are produced by the copying machines 12 and 13 for the desired total of 5.

The print control unit 33 is responsive to the status of the flip-flops in the unit 27 and operative to utilize only those of the copying machines 12, 13 and 14 in the interlocked copying mode which are not broken or otherwise disabled. These copying machines will be used until the register 32 is decremented to zero and the desired number of copies have been made.

Superimposed Copying Mode

Images of two or three original documents may be superimposed on each other by depressing a superimposed copying mode key on any of the copying machines 12, 13 or 14 in addition to the interlocked copying mode key. The apparatus 11 functions in the same manner described above in the interlocked copying mode except as follows.

Assuming for example that two original documents are placed in the copying machines 12 and 13, the interlocked copying mode and superimposed copying mode flip-flops in the unit 26 will be set in addition to the flip-flops in the unit 29 corresponding to the copying machines 12 and 13. The scan control unit 34 produces signals S1 and S2 which enable the gates 37 and 38. This connects the outputs of the interfaces 18 of the copying machines 12 and 13 to the mixer 41. Thus, the outputs of the scanners 17 of the copying machines 12 and 13 are combined in the mixer 41 and the resulting copy or copies consists of the images of the two original documents superimposed on each other. Up to three superimposed copies of up to three documents may produced simultaneously in the apparatus 11 as illustrated.

Collation Copying Mode

In this mode it is desired to make a plurality of copies of a multi-page document and automatically collate the copies. The apparatus 11 functions in the same manner as in the interlocked copying mode except as follows.

In addition to the interlocked copying mode key a collation copying mode key is depressed. Thus, the interlocked copying mode and collation copying mode flip-flops of the unit 26 are set. In addition, the maximum page number of the document, or the number of pages, is set into the page number register 31 through depression of numerical keys or the like. The number of copies desired is set into the copy number register 32.

Assuming for example that it is desired to make 3 copies of a five page document, pages 5, 4 and 3 are placed in the copying machines, 14, 13 and 12 respectively. The print control unit 33 produces signals C1, C2 and C3 to enable the gates 42, 43 and 44 respectively. The scan control unit 34 produces a signal S3 to enable only the gate 39.

During the first scanning operation, only the signals D3 corresponding to page 5 of the document are fed to the mixer 41. In other words, only page 5 of the document is scanned by the copying machine 14. The resulting signals A1, A2 and A3 are fed to all of the copying machines 12, 13 and 14 to produce the desired 3 copies.

Then, the scan control unit 34 enables the gate 38 to connect the copying machine 13 to the mixer 41. Thus, during the next scan operation page 4 of the document is scanned by the copying machine 13 and copies thereof produced by all of the copying machines 12, 13 and 14. The page control unit 36 and page number register 31 control the scan control unit 34 to sequentially enable the gates 39, 38 and 37 in descending order.

After the copying machine 12 scans page 3 of the document and all of the copying machines 11, 12 and 13 produce copies thereof, pages 2 and 1 of the document are placed in the copying machine 14 and 13 respectively. The gates 39 and 38 are sequentially enabled to copy pages 2 and 1 using the copying machines 14 and 13 respectively.

Since the pages of the document are copied in descending order of page numbers, the pages of the copies will be automatically collated in the discharge trays (not shown) of the copying machines 12, 13 and 14. Page 5 will be copied and discharged first, with page 4 on top of page 5, page 3 on top of page 4, etc. This arrangement greatly speeds up the copying operation not only by utilizing the interlocked copying mode as discussed above but also since a page of a document may be replaced with another page in one of the copying machines while another copying machine is scanning another document.

In summary, it will be seen that the present invention provides a unique and novel copying apparatus which is capable of operating in four different modes which are highly advantageous over the prior art. The individual copying machines may be provided in separate housings or integrated into a single housing. The former arrangement is preferred since it facilitates expansion of the system by adding more copying machines. Although the detailed construction of the printers 21 is not shown in detail, the printers 21 may be of the electrostatic, impact, ink jet or any other type known in the art capable of reproducing an original document in response to electrical signals corresponding thereto.

The utilization rate of the present apparatus 11 is very high since the function of a disabled copying machine may be automatically taken over by the other copying machines.

Various modifications will become possible for those skilled in the art after receiving the teachings of the present disclosure without departing from the scope thereof. For example, the control unit may be embodied by a microcomputer. The apparatus may be capable of operating in more or less than four copying modes. In order to simplify the control unit, various sub-operations may be combined.

In an installation where the data signals are in digital rather than analog form, the gates 37, 38, 39, 42, 43 and 44 may be replaced by AND gates and the mixer 41 replaced by an OR gate.

What is claimed is:

1. A copying apparatus including a plurality of copying machines each having scanning means for scanning an original document and producing electrical signals corresponding thereto and printing means for reproducing an original document in response to electrical signals corresponding thereto, characterized by comprising:

switch means for selectively connecting at least one of the scanning means to at least one of the printing means;

signal mixing means, the switch means connecting the scanning means of one of the copying machines to the printing means of any of the copying machines through the mixing means;

a plurality of input gate means connected between respective scanning means and an input of the mixing means, a plurality of output gate means connected between an output of the mixing means and respective printing means and control means for controlling the switch means and input and output gate means;

the control means being operative to control the apparatus to operate in an individual copying mode by controlling the switch means to connect the scanning means of each copying machine to the printing means thereof and to inhibit all of the input and output gate means.

2. A copying apparatus including a plurality of copying machines each having scanning means for scanning an original document and producing electrical signals corresponding thereto and printing means for reproducing an original document in response to electrical signals corresponding thereto, characterized by comprising:

switch means for selectively connecting at least one of the scanning means to at least one of the printing means;

signal mixing means, the switch means connecting the scanning means of one of the copying machines to the printing means of any of the copying machines through the mixing means;

a plurality of input gate means connected between respective scanning means and an input of the mixing means, a plurality of output gate means connected between an output of the mixing means and respective printing means and control means for controlling the switch means and input and output gate means;

the control means being operative to control the apparatus to operate in an interlocked copy mode by controlling the switch means to disconnect the scanning means of each copying machine from the printing means thereof, to enable only one input gate means corresponding to a selected scanning means for scanning an original document and enabling at least two output gate means corresponding to selected printing means for reproducing the original document.

3. An apparatus as in claim 2, further comprising input means for designating a number of copies to be produced, the control means enabling the output gate means in accordance with the number of copies.

4. A copying apparatus including a plurality of copying machines each having scanning means for scanning an original document and producing electrical signals corresponding thereto and printing means for reproducing an original document in response to electrical signals corresponding thereto, characterized by comprising:

switch means for selectively connecting at least one of the scanning means to at least one of the printing means;

signal mixing means, the switch means connecting the scanning means of one of the copying machines to the printing means of any of the copying machines through the mixing means;

a plurality of input gate means connected between respective scanning means and an input of the mixing means, a plurality of output gate means connected between an output of the mixing means and respective printing means and control means for controlling the switch means and input and output gate means;

the control means being operative to control the apparatus to operate in a superimposed copy mode by controlling the switch means to disconnect the scanning means of each copying machine from the printing means thereof, enable at least two input gate means corresponding to selected scanning means for scanning original documents and enabling at least one output gate means corresponding to at least one selected printing means for reproducing the superimposed original documents.

5. A copying apparatus including a plurality of copying machines each having scanning means for scanning an original document and producing electrical signals corresponding thereto and printing means for reproducing an original document in response to electrical signals corresponding thereto, characterized by comprising:

switch means for selectively connecting at least one of the scanning means to at least one of the printing means;

signal mixing means, the switch means connecting the scanning means of one of the copying machines to the printing means of any of the copying machines through the mixing means;

a plurality of input gate means connected between respective scanning means and an input of the mixing means, a plurality of output gate means connected between an output of the mixing means and respective printing means and control means for controlling the switch means and input and output gate means;

the control means being operative to control the apparatus to operate in a collation copy mode by controlling the switch means to disconnect the scanning means of each copying machine from the printing means thereof, sequentially enable input gate means corresponding to selected scanning means for scanning original documents and continuously enabling at least two output gate means corresponding to selected printing means for reproducing the original documents.

6. An apparatus as in claim 5, in which the control means is operative to sequentially enable the input gate means corresponding to the original documents in descending order of page numbers of the documents.

7. An apparatus as in claim 6, further comprising input means for designating a maximum page number, the control means sequentially enabling the input gate means in accordance with the maximum page number.

* * * * *